Figure 1:
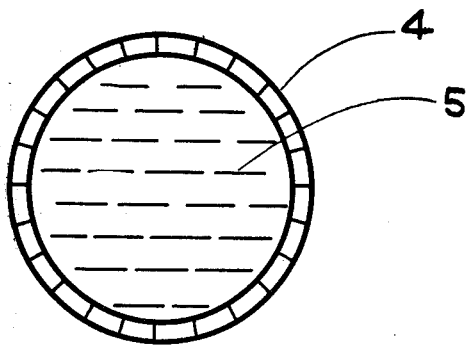

United States Patent [19]

Tate

[11] 4,211,668

[45] Jul. 8, 1980

[54] PROCESS OF MICROENCAPSULATION AND PRODUCTS THEREOF

[75] Inventor: Clarence R. Tate, Fairfield, Ill.

[73] Assignee: Thalatta, Inc., Fairfield, Ill.

[21] Appl. No.: 899,580

[22] Filed: Apr. 24, 1978

Related U.S. Application Data

[63] Continuation-in-part of Ser. No. 775,203, Mar. 7, 1977, abandoned.

[51] Int. Cl.$^2$ .............................................. B01J 13/02
[52] U.S. Cl. ........................................ 252/316; 264/4
[58] Field of Search ............................ 252/316; 264/4

[56] References Cited

U.S. PATENT DOCUMENTS

| | | | |
|---|---|---|---|
| 2,800,457 | 7/1957 | Green et al. | 252/316 |
| 3,173,878 | 3/1965 | Reyes | 252/316 |
| 3,943,063 | 3/1976 | Morishita et al. | 252/316 |
| 4,016,099 | 4/1977 | Wellman et al. | 264/4 |

*Primary Examiner*—E. Suzanne Parr

*Attorney, Agent, or Firm*—Keil & Witherspoon

[57] ABSTRACT

This invention relates to a process for making microscopic size capsules from an emulsion having an inner oily or hydrophobic phase (material to be encapsulated) and an outer hardenable hydrophilic phase. The process is characterized by the step of contacting said emulsion with a break-up fluid capable of dividing said emulsion into substantially separate capsules having an inner hydrophobic phase and an outer hardenable hydrophilic phase; and then hardening the hydrophilic phase of said capsules to form microscopic size capsules or microencapsulations.

The separated capsules can contain clusters of capsules, or they may be made as separate, individual capsules. In the preferred embodiment, the break-up fluid contains a surfactant capable of enhancing the break-up function of the fluid so that the separated capsules are predominately individual capsules.

This invention also relates to microscopic size capsules formed by this process.

14 Claims, 3 Drawing Figures

PROCESS OF MICROENCAPSULATION AND PRODUCTS THEREOF

This application is a continuation-in-part of my pending application Ser. No. 775,203 filed Mar. 7, 1977, now abandoned.

Microencapsulation provides a means of packaging, separating or storing materials on a microscopic scale. Minute particles or droplets of almost any material can be encased by an impervious capsule wall and thus isolated. The contents of a capsule can be made available by mechanical rupture of the capsule wall, by disintegration by electrical or chemical means or by a leeching action carried out in an appropriate liquid environment. Alternately the capsule can be employed to permanently contain its contents without rupture. This is advantageous, for example, where suspended in the contained liquid are color-coded micromagnets, said micromagnets being magnetically orientable and therefore capable of presenting selected colors to the viewer.

Microencapsulation has been applied to describe particle coating processes producing capsules of minute size, for example, varying in size from a few microns in diameter to 2000μ or larger.

Microencapsulation has been practiced for many years, for example, as dosage forms for drugs, to "lock-in" flavors and essences, in National Cash Register Company's NCR (no carbon required) paper, etc. The pressure of type striking the NCR paper ruptures the capsules and allows reaction to take place producing a resulting image.

One well known method of microencapsulation is coacervation which involves:

(a) establishment of a three-phase system with a liquid vehicle as the continuous phase, and coating material and material to be coated as the dispersed phases;
(b) deposition of liquid polymeric material around the material to be coated;
(c) hardening of the polymer coating material.

I have now discovered a process of microencapsulation which comprises preparing an emulsion having an inner oily or hydrophobic phase (containing the material to be encapsulated) and an outer hardenable hydrophilic phase and then contacting said emulsion with a break-up fluid capable of dividing said emulsion in substantial separate capsules having an inner hydrophobic phase and an outer hardenable hydrophilic phase and then hardening the hydrophilic phase of said capsule to form the microencapsulate. In the preferred embodiment, the break-up fluid contains a surfactant capable of enhancing the break-up function of the fluid so that the separated capsules contain predominately sole capsules rather than clusters of capsules.

In this application, by an individual capsule is meant a capsule having a sole hydrophobic droplet. By a cluster of capsules is meant a capsule having a plurality of hydrophobic droplets. The ratio of individual capsules to clusters can be varied by the use of various solvents and mixtures of solvents alone or in combination with surfactants. I have obtained substantially 100% individual capsules as well as substantially 100% clusters.

The present invention may be summarized as follows:

I. Preparation of emulsion
 (1) inner oily or hydrophobic phase of material to be encapsulated;
 (2) hardenable outer continuous hydrophilic phase.

II. Contact I with break-up fluid yielding
 (1) individual capsules or small clusters of capsules;
 (2) where the break-up fluid contains surfactant, clusters of capsules are minimized.

III. Harden outer layer of II to form hardened capsules.

Referring to the drawings which present cross-sectional side views,

FIG. 1 shows closed capsule shell 4 containing a hydrophobic liquid 5.

Figure 2:
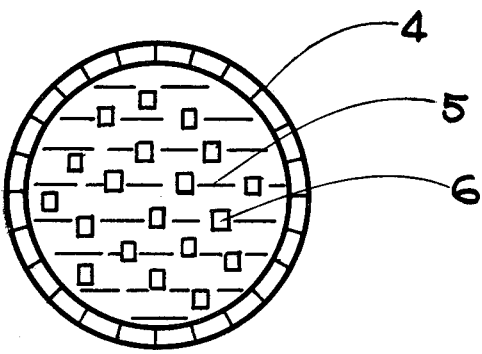

FIG. 2 shows shell wall 4 containing a hydrophobic liquid 5 in which is dispersed solid particles 6.

Figure 3:
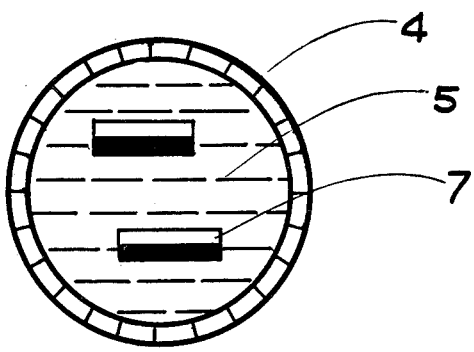

FIG. 3 shows shell wall 4 containing hydrophobic liquid 5 in which is suspended color-coded micromagnets 7.

The drawings show single capsules but a plurality of capsules are generally used. The shell is the hardened outer hydrophilic phase.

The following examples, in which all proportions are given by weight unless otherwise noted, will serve to illustrate but not limit the invention.

Microscopic capsules containing mineral oil were rapidly and relatively inexpensively made as follows:

EMULSIFICATION

First the hydrophilic phase containing an aqueous gelatin solution was prepared by dissolving, at about 120° F., 50 parts 275 bloom strength pork gelatin with 12 parts sorbitol in 290 parts distilled water. After the gelatin had dissolved, 130 parts methanol was added to the solution. Into 100 parts of this gelatin solution was then mixed the hydrophobic phase containing 100 parts of a second liquid, which in this example is white mineral oil (31 USP, Amoco), and an emulsion was formed by agitation, the oil forming droplets in the gelatin solution, and the size of the droplets being determined by the time and vigor of the agitation. At this stage the emulsion consisted of a two-phase system, the polymer wall former, in solution, being the continuous phase and the oil droplets suspended therein being the discontinuous phase.

DISPERSION IN BREAK-UP BATH

The 200 parts emulsion was then dispersed, by stirring, into 300 parts xylol, at about 70° F., the xylol performing as a break-up bath in which the continuous phase gelatin solution divided into separate spherical and spheroidal capsule shells, each shell containing the oil droplet it had carried in the emulsion. A surfactant employed, such as an oil detergent containing zinc dialkyldithiophosphate (Texaco Super Motor Detergent), in a ratio of about 20 parts mixed with the 300 parts xylol, aided in the division of the gelatin phase into separate, individual capsules.

Other surfactants used in varying proportions have been calcium petroleum sulfonate (25H, Witco Chemical), Alkylaryl Sulfonamido Ester (Estersulf 14, Trask Corp.), Sulfated Soya Oil (OY 75, Trask Corp.), or a mixture of 50% Calcium sulfonate (TLA-414, Texaco) and 50% ashless dispersant (TC-9781, Texaco).

HARDENING

The xylol break-up bath, together with the now separated, individual microscopic capsules dispersed in it, still under stirred agitation, was then cooled to about 45° F. to partially congeal the gelatin and the capsules were then permitted to settle to the bottom of the bath. Excess break-up bath fluid was removed and the remainder, with its capsules dispersed therein, was then mixed with about 600 parts of a hardening bath, at about 40° F., prepared of, by volume, 200 parts anhydrous isopropyl alcohol, 150 parts xylol, and 50 parts steam distilled turpentine. Two or three successive washings in the hardening bath were usually employed and the now completed microscopic capsules were screened out and any hardening bath still coating the walls was removed by air drying at room temperature, the relative humidity being kept preferably under 40%.

As microcapsules decrease in size, settling in the bath becomes slower and often, therefore, the settling step was eliminated and the entire bath-capsule mixture was mixed with a larger quantity of the hardening bath.

The above proportions may be varied and the break-up bath has comprised hydrocarbon solvents, both aromatic and aliphatic. Terpenes and chlorinated solvents have also been employed. For example, toluene has been used with or in place of xylol, and break-up baths have been made of 275 parts VM & P naptha and 80 parts trichlorethylene; or 275 parts turpentine and 50 parts trichlorethylene; or 250 parts mineral spirits with 100 parts trichloroethylene.

Oils have also been used for the break-up bath. Hydrocarbon oils such as low viscosity mineral oils have been used as has vegetable oils such as corn oil, and these oils blended with hydrocarbon solvents and/or terpenes.

In some break-up baths the capsules retrived consisted of walled clusters, single, tiny capsules containing within several smaller capsules. In some, especially those in which had been incorporated a surfactant, such as the oil detergent mentioned above, the aqueous gelatin solution was divided into lone capsules such as those shown in the drawings.

The temperatures given may also be varied. The temperature of the gelatin solution, of course, must be kept above the gel point until the emulsion has been dispersed in the break-up bath, and the lowering of the temperature of the break-up bath and using a hardening bath at a lowered temperature accelerated the hardening of the shell walls and helped to prevent agglomeration of the unhardened capsules. Capsules have been produced, however, with both baths being at room temperature.

The capsule wall-forming material may employ a gelatin of higher or lower bloom strength than the 275 mentioned and other hydrophilic gellable colloids such as gum arabic and agar may be employed, although gelatin is preferred. And glycerine has been used as a plasticizer for the gelatin instead of sorbitol and capsules have been made with no plasticizer at all. Also, ethyl alcohol in place of or with methanol has been used in the aqueous gelatin solution, and the gelatin was usually dissolved in the water and the alcohol then added.

Capsule shell walls have also been made using a copolymer of vinyl acetate (Gelva C-5 V-10, Monsanto) which was dissolved 10 parts C-5 V-10 in 98 parts water and 2 parts 28% ammonia. Five parts of the copolymer solution were then mixed with 200 parts of the aqueous gelatin solution.

In another formulation, an acrylic modified capsule shell wall was formed by mixing into 100 parts of the aqueous gelatin solution 10 parts of an acrylic emulsion (Rhoplex AC-61, Rohm & Haas) which had been diluted 20 parts AC-61 to 250 parts water.

Still another shell wall was made with polyvinyl alcohol (Gelva 20—20, Monsanto) dissolved 20 parts PVA in 290 parts water and 130 parts methanol, and 10 parts of the PVA solution were mixed with 200 parts of the aqueous gelatin solution.

In each case, the shell wall contained a hydrophilic hardenable colloid which is a natural or synthetic polymer or combinations thereof.

Although it is not a requirement of this invention, cross-linking of the capsule wall material may be effected with the use of any suitable cross-linking agent such as an aldehyde, for example, by the addition to the aqueous wall forming solution of about one part of 37% formaldehyde. The use, in the break-up bath of a highly overbased calcium sulfonate (such as TLA-414, Texaco) or a magnesium sulfonate (such as 9717, Amoco) may be useful in raising the pH of the wall forming material so as to aid in cross-linking.

In addition the hardening bath has employed other alcohols mixed with a hydrocarbon and/or a terpene, such as ethyl alcohol or methyl alcohol, although isopropyl alcohol is preferred. Hardening baths, for example, have been prepared from, by volume, 500 parts toluene with 500 parts isopropyl alcohol, and from 500 parts turpentine with 500 parts isopropyl alcohol. It was also found that a bath of isobutyl alcohol or n-butyl alcohol, without a hydrocarbon or terpene solvent, satisfactorily hardens the gelatin walls. Thus, it is not necessary to combine either of these alcohols with a hydrocarbon solvent, terpene, or chlorinated solvent before mixing them with the break-up bath.

In accord with this invention, the first step, in which the inner oil or hydrophobic phase is emulsified in the wall forming exterior aqueous phase, requires substantial immiscibility between the two phases.

The second step, in which this emulsion is then mixed with the break-up bath, requires that the break-up bath be substantially immiscible with the polymer wall forming phase. The break-up bath may be, or may be not, miscible with the inner hydrophobic phase being encapsulated.

The third step, in which the hardening bath is introduced into the break-up bath, requires that the hardening liquid be substantially miscible with the break-up bath.

Substantial miscibility, here, is meant to indicate the ready blending of two or more liquids without the formation, between one of the liquids and the other, or others, of a separate phase or emulsion, which emulsion would, in that particular step, produce a deleterious effect in that step. Substantial immiscibility is meant to indicate the lack of such ready blending and thus the formation of an emulsion.

The hardening liquids, always miscible with the break-up bath, will be, either of themselves, or in combination with other liquids, substantially immiscible with the wall forming aqueous solvent. For example, isopropyl alcohol, while itself miscible with an aqueous solution, when mixed with, say, equal parts of xylol forms a liquid substantially immiscible with the wall forming solvent. Or, isopropyl alcohol, introduced into a break-up bath of xylol, blends and becomes, in situ, substantially immiscible with the wall forming solution. Isobutyl alcohol, if used as a hardener, is itself, substantially immiscible with the aqueous solvent.

To further illustrate miscibilities, if mineral oil, say, is chosen for the break-up bath, isobutyl alcohol, or normal butyl alcohol, used as a hardener, will blend with the mineral oil, with which it is miscible. Isopropyl alcohol, alone, however, would not be miscible with the mineral oil. A hardening bath employing isopropyl alcohol mixed with, say, an equal amount of xylol, is miscible with a mineral oil break-up bath, however.

In summary, the hardening liquid is always miscible with the break-up bath and is, either of itself, or in combination with other liquids substantially immiscible with the wall forming solvent. While I do not wish to be bound by theoretical considerations, hardening is believed to be the result of a reaction between the hardening mixture and the wall forming polymer, causing it to force out its aqueous solvent into the hardening bath. Neither the break-up bath, nor the hardening mixture, will, of course, be selected from liquids which would dissolve the wall forming polymer.

Microcapsules have been produced in this manner in sizes from about one micron to about 2000μ. The desired size of the capsules was achieved by selection of the viscosity of the aqueous colloid solution, i.e., the proportions and type of the wall forming material to its solvent, and/or the time and vigor of agitation used to effect the emulsion.

Liquids that have been so encapsulated include turpentine, mineral oils, vegetable oils, animal oils, liquid polymers (Amoco polybutene, Indopol L-14), as well as such solvents as xylol, toluene, and mineral spirits.

Solids suspended in the encapsulated liquids include pigments, such as carbon black, dispersed in linseed oil and turpentine. The capsules containing this mixture were coated onto a paper substrate and, upon being ruptured, transferred marking to a second paper.

Other solids suspended in the encapsulated liquid have been color coded micromagnets described in my U.S. Pat. No. 3,460,248, No. 3,406,363, and No. 3,938,263, said micromagnets being suspended in a thixotropic oil or liquid polymer. The capsule walls were transparent and the capsules were mixed with a transparent binder which was then coated onto a substrate where the binder was permitted to harden either by solvent evaporation or by catalytic curing, and the micromagnets, being magnetically orientable, could be selectively rotated to present colorful patterns to the viewer. These are described and claimed in my application Ser. No. 775,202 filed Mar. 7, 1977, now abandoned, and in its continuation-in-part Ser. No. 777,180 filed Mar. 14, 1977, now abandoned, and in its continuation-in-part Ser. No. 872,214 filed Jan. 25, 1978, now pending. Said applications Ser. Nos. 775,202, 777,180 and 872,214 are by reference incorporated into this application, as if part hereof.

The present invention can be employed to microencapsulate a wide variety of materials. The following are non-limiting illustrations of such materials:

| | | |
|---|---|---|
| adhesives | foods | perfumes |
| blowing agents | fuels | photographic agents |
| catalysts | inks | pigments |
| curing agents | insecticides | plasticizers |
| detergents | leavening agents | propellants |
| drugs | metals | solvents |
| dyes | monomers | stabilizers |
| flavors | oils | vitamins |
| | | paints |

As is quite evident other hydrophobic materials, other hardenable hydrophilic materials, other break-up fluids and surfactants employed in the break-up fluids are known or will be constantly developed which could be useful in this invention. It is, therefore, not only impossible to attempt a comprehensive catalogue of such components, but to attempt to describe the invention in its broader aspects in terms of specific chemical names of all components that could be used would be too voluminous and unnecessary since one skilled in the art could by following the description of the invention herein select useful hydrophobic materials, hydrophilic materials, break-up fluids and surfactants employed therein. This invention lies in a process of microencapsulation and products formed therefrom. Their individual components are important only in the sense that they affect such microencapsulation and products thereof. To precisely define each possible component and each possible variation in preparative techniques in light of the present disclosure would merely call for knowledge within the skill of the art in a manner analogous to a mechanical engineer who prescribes in the construction of a machine the proper materials and the proper dimensions thereof. From the description in this specification and with the knowledge of one skilled in the art, one will know or deduce with confidence the applicability of specific components suitable in this invention. In analogy to the case of a machine, wherein the use of certain materials of construction or dimensions of parts would lead to no practical or useful result, various materials will be rejected as inapplicable while others would be operative. One can obviously assume that no one will wish to make a useless microencapsulate nor will be misled because it is possible to misapply the teachings of the present disclosure to do so.

Thus, the examples given herein are intended to be illustrative and various modifications and changes in the materials and structures may be apparent to those skilled in the art without departing from the spirit of this invention.

I claim:
1. A process of making microcapsules having transparent capsule shells containing a hydrophobic liquid which is characterized by:
   1. forming an emulsion comprising an outer hydrophilic phase and droplets of a hydrophobic liquid suspended therein as the inner hydrophobic phase, said outer hydrophilic phase comprising a hardenable wall forming polymeric material dissolved in an aqueous solvent;
   2. contacting said emulsion with a break-up fluid which is not a solvent for said polymeric material, which is substantially immiscible with the polymeric material solvent, and which is capable of dividing said emulsion into separate capsules having an inner hydrophobic phase and an outer hydrophilic phase;
   3. then hardening the hydrophilic phase of said capsules with a hardening liquid which is substantially miscible with the break-up bath, which is not a solvent for said polymeric material, and which is, of itself or in combination with another liquid, substantially immiscible with said polymeric material solvent.

2. The process of claim 1 where the break-up fluid contains a hydrocarbon solvent; a terpene; vegetable, or mineral oils, or combinations thereof.

3. The process of claim 1 where the hardening medium contains an alcohol, a hydrocarbon solvent, a terpene or combinations thereof.

4. The process of claim 1 where the break-up fluid contains a surfactant.

5. The process of claim 1 where the hydrophilic exterior phase contains a gelatin.

6. The process of claim 2 where the break-up fluid contains a surfactant.

7. The process of claim 3 where the break-up fluid contains a surfactant.

8. The product of claim 1.

9. The product of claim 2.

10. The product of claim 3.

11. The product of claim 4.

12. The product of claim 5.

13. The product of claim 6.

14. The product of claim 7.

* * * * *